(No Model.)

J. F. MARTIN.
CONDUIT FOR ELECTRICAL WIRES.

No. 275,399. Patented Apr. 10, 1883.

Witnesses:
W. B. Masson
George Eaton

Inventor:
John F. Martin
by J. R. Nottingham,
Atty.

UNITED STATES PATENT OFFICE.

JOHN F. MARTIN, OF CHICAGO, ILLINOIS, ASSIGNOR TO THE MARTIN ELECTRIC WIRE CONDUCTING COMPANY, OF SAME PLACE.

CONDUIT FOR ELECTRICAL WIRES.

SPECIFICATION forming part of Letters Patent No. 275,399, dated April 10, 1883.

Application filed June 2, 1882. (No model.)

*To all whom it may concern:*

Be it known that I, JOHN F. MARTIN, a citizen of the United States, residing at Chicago, in the county of Cook and State of Illinois, have invented a new and useful Conduit for Electrical Wires; and I do hereby declare the following to be a full, clear, and exact description of the invention, which will enable others skilled in the art to which it appertains to make and use the same, reference being had to the accompanying drawings, which form a part of this specification.

The object of my invention is to provide a non-combustible and fire-proof conductor for electric-light and other wires to be conveyed through buildings, that will prevent the deflection of electricity and guard against danger of fire therefrom, as will hereinafter be more fully described in the specification and pointed out in the claims.

In carrying out my invention I first prepare a suitable insulating-compound, preferably of marble-dust, plaster-of-paris, and glue-water, commonly called "sizing," or the equivalent therefor, which I mold into tubes or plates of suitable length and of a size proportionate to the number of wires desired to be employed. After the compound is prepared I take shells or tubes made of paper or veneer, of the proper dimensions, and place them in rows perpendicular, using as cores brass rods placed in the center of the shells with their ends resting in bearings. Said rods should be well oiled to prevent the mixture adhering to them. The mixture is then poured in at the upper ends of the shells, and while it is hardening the rods should be turned gently two or three times, so that they may be readily and easily withdrawn at the proper time, which is about twenty minutes after the mixture has been poured in. A short sleeve may be slipped on one end of the brass rods, which will, when the mixture is poured into the shell around the core, form a recess for the reception of a glass or other tube. The other end of the tube or plate may be recessed after molding by using an ordinary countersink; or, instead of using the sleeve on the rod, both ends of the tube or plate may be recessed, as last described. The tubes thus prepared are permanently incased within the shells and with the proper channels for the reception of the wires. After three or four days they will be found sufficiently hard for all practical purposes; but they will improve with age. Plates provided with a series of channels arranged parallel with each other may be molded in the same manner.

Figure 1:
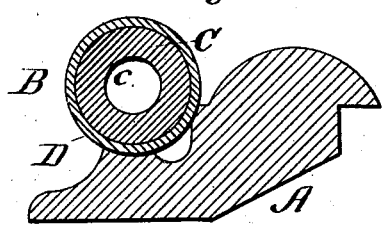
Figure 2:
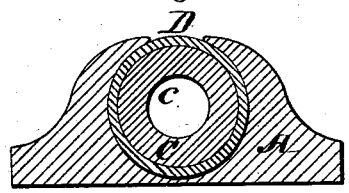
Figure 3:
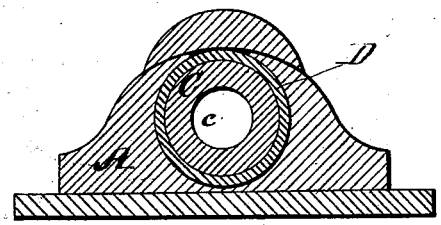
Figure 4:
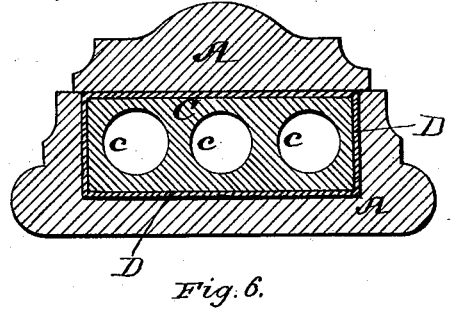
Figures 5, 6:
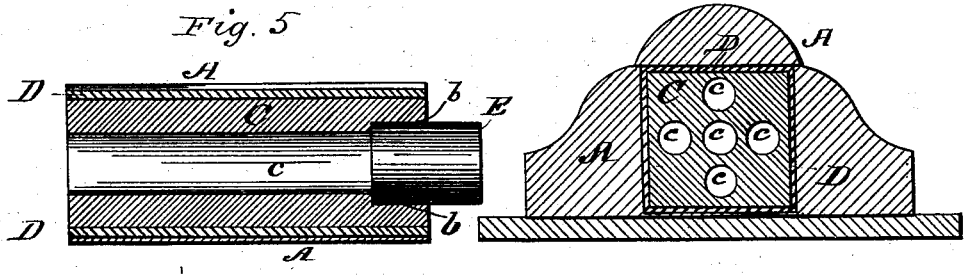

In the drawings, Figure 1 represents a view in cross-section, showing the conduit forming a part of the finishing work of a building; Fig. 2, a similar view, showing the conduit partially let into the molding or other finishing-piece of a building; Fig. 3, a similar view, showing the conduit concealed in the molding or other finishing-piece of a building; Fig. 4, a similar view, showing a modified form of the conduit; Fig. 5, a longitudinal sectional view, showing the connecting-tubes; and Fig. 6, a view in cross-section, showing a modified form of conduit.

A indicates the molding or other finishing-piece of a house or other building, and B the conduit designed to be let into or form a part of the same.

C is a tube or plate, made of an insulating compound, and provided with one or more passages, *c*, for the reception of the conducting-wires. A shell, D, made of paper, which may be ornamented, envelops said tube or plate, whereby additional strength is given to the same, at the same time rendering them less liable to breakage, more convenient to handle, and enables them to be used in many cases without additional casings or moldings, especially when ornamented, as above stated. The ends of the tubes or plates are recessed, as shown at *b*, to receive a tube, E, of glass or other insulating material, thus making a continuous insulation through said tubes or plates.

My invention is especially designed for insulating electric light and other wires carried through buildings, where they may be concealed in the moldings, casings, or other parts of the structure, or they may be incased, either wholly or in part, in ornamented strips or moldings especially constructed of any desired style, pattern, or finish for that purpose, and run or placed on or across the walls and ceilings, in which case, however, the moldings should have a space cut or "stuck" therein to fit and support the tubes.

When veneer shells are used as the envelope containing the insulating compound, they may be made of wood to match the wood-work of a building, and admit of a high polish and finish. If it be desired, the paper shells may be made of any desired appearance and finish by covering them with an additional adhering-shell made from wood veneer or appropriate paper or paper-wood veneer, and finishing them with a hard polish. The tubes thus finished may be partly concealed in the molding and yet seem to be a part of it. In putting these insulating tubes in buildings, although they may be used without moldings or other covering, I prefer to place them in some portion of structure or finishing work of the building, or in moldings especially prepared for them, or partly in both, as may be most convenient.

I have thus illustrated some of the ways in which the conduit may be used in furtherance of the purposes for which it is adapted.

The conduit thus made and employed possesses many advantages, being both fire-proof and non-combustible, which are two essential features where electric wires are run through buildings. The compound herein described, used for making the insulating tubes or plates, I purpose to have embodied in a separate application, and therefore lay no claim to it in this application.

Having thus fully described my invention, what I claim, and desire to secure by Letters Patent, is—

1. The herein-described non-combustible and fire-proof tube or plate, composed of an insulating compound consisting of marble-dust, plaster-of-paris, and glue-water, and covered with a shell of paper or veneer, whereby additional strength is given to the same, substantially as set forth.

2. An insulating non-combustible and fire-proof conduit for electrical conductors, consisting of plates or tubes composed of an insulating compound consisting of marble-dust, plaster-of-paris, and glue-water, provided with passages, as described, to receive the conducting-wires, said tubes or plates recessed at their ends to receive the end of a tube of glass or equivalent non-conducting material, with a paper or veneer covering, whereby it may be made a part of the finishing work of a house or other structure, substantially as set forth.

3. The insulating non-combustible and fire-proof conduit, consisting of the tubes or plates composed of an insulating compound consisting of marble-dust, plaster-of-paris, and glue-water, provided with passages, as described, to receive the conducting-wires, said tubes or plates recessed at their ends, the tubes of glass or equivalent non-conducting material, and the shells of paper or veneer, the whole adapted to be let into or form a part of the finishing work of a house or other building, for the purposes set forth.

4. The combination of the tubes or plates C, composed of the insulating compound consisting of marble-dust, plaster-of-paris, and glue-water, provided with passages, as described, to receive the conducting-wires, said tubes or plates recessed at their ends, the tube E, shell D, and finishing-piece A, substantially as and for the purpose set forth.

5. As an article of manufacture, an electrical conduit composed of an insulating compound consisting of marble-dust, plaster-of-paris, and glue-water, molded into tubes or plates provided with passages, said tubes or plates being incased within an ornamented paper or veneer shell, the whole constructed as described, whereby it may be let into or form a part of the finishing work of a house or other structure, as and for the purposes set forth.

In testimony that I claim the foregoing I have hereunto set my hand and seal this 26th day of May, A. D. 1882.

JOHN F. MARTIN. [L. S.]

Witnesses:
N. I. FITCH,
J. B. WHITE.